United States Patent Office 3,214,324
Patented Oct. 26, 1965

3,214,324
FIBROUS MATERIALS IMPREGNATED WITH A PARTIAL REACTION PRODUCT DERIVED FROM FATTY GUANAMINES AND EPOXY RESINS
Dwight E. Peerman, Minneapolis, Minn., assignor to General Mills, Inc., a corporation of Delaware
No Drawing. Filed May 11, 1962, Ser. No. 194,149
8 Claims. (Cl. 161—185)

The present invention relates to fibrous materials which are impregnated with certain thermosetting resins and to the laminates derived from such impregnated fibrous materials.

Thermosetting resins have been used heretofore to impregnate fibrous materials. Examples of these resins are phenolic resins, polyester resins and epoxy resins. The phenolic and polyester resins have been used extensively, mainly because they have been somewhat less expensive than epoxy resins. However, laminates prepared from fibrous materials which have been impregnated with epoxy resins offer higher compression strengths, higher resistance to delamination, and higher moisture resistance than do the more conventional laminates of phenolic and polyester thermosetting resins. Thus, epoxy laminates are becoming increasingly important in a variety of industries.

Various techniques have been used to impregnate fibrous materials with epoxy resin-curing agent systems. For practical purposes, they can be divided essentially into two techniques: (1) wet lay-ups and (2) dry lay-ups. Wet lay-ups involve the impregnation of the fibrous material with a 100 percent solids, nonsolvent-containing resin and the immediate (or essentially immediate) application of the impregnated fibrous material to the laminating operation. The lower-viscosity resins, such as the liquid commercial-grade diglycidyl ether of Bisphenol A, are most commonly used in this procedure, since the higher molecular weight resins are too viscous to provide satisfactory wetting action unless worked hot.

Dry lay-ups involve the impregnation of the fibrous material with either a 100 percent solids or a solvent-containing resin system in advance of the production operation. If a 100 percent solids system is employed, the resin is applied to the fibrous material and gelled or B-staged by the application of heat to produce a dry tack-free material capable of flow on the application of heat. If a solvent system is employed, the fibrous material is coated and the solvent driven out as best possible to provide a tack-free surface capable of cure by subsequent application of heat.

Various epoxy resin-curing agent systems have been used for the impregnation of fibrous materials by the above techniques with varying degrees of success. Thus, many of the epoxy resin-curing agent systems require strong solvents such as acetone or methyl ethyl ketone which are flammable and pose a fire hazard. Even with these strong solvents, complicated procedures may be required to dissolve the systems. For instance, when using phthalic anhydride (only slightly soluble in acetone) as a curing agent, it is necessary to fuse the resin and curing agent, followed by refluxing with acetone to effect dissolution. If the epoxy resin and curing agent are used in an unreacted state, various problems are presented with many systems—i.e., the curing agent and/or epoxy resin may be toxic requiring special handling methods; the curing agent may be so fast acting that little time will be available for the laminating operation; and the mixture may not be homogeneous and, therefore, produce laminates having unevenly cured portions. Fibrous materials impregnated with partially reacted or "B-staged" resins available prior to the present invention have had a very short shelf life. Thus, it is frequently necessary to store them under refrigeration. Additionally, the properties of the laminates prepared from various of such systems are not entirely satisfactory.

It is an object of the present invention to provide novel compositions comprising fibrous materials impregnated with certain thermosetting resins.

Another object of the invention is to provide such compositions wherein the thermosetting resins comprise epoxy resins nad certain guanamines.

Still another object of the invention is to provide such compositions wherein the thermosetting resins are partial reaction products of epoxy resins and certain guanamines.

It is also an object of this invention to provide impregnated fibrous material which can be prepared by a variety of techniques, which can be stored at ambient room temperatures for long periods of time, and from which laminates can be prepared in a relatively short time.

A further object of my invention is to provide laminates prepared from such impregnated fibrous materials.

These and other objects will become apparent from the following detailed description.

It has now been discovered that laminates having excellent properties can be prepared from fibrous materials which have been impregnated with epoxy resin-fatty guanamine systems. A particularly important aspect of the present invention is the discovery that the fibrous materials can be impregnated with the epoxy resin-fatty guanamine systems by a variety of techniques. Thus, the guanamine can be dissolved in a liquid epoxy and used as a wet lay-up; the guanamine and epoxy can be dissolved in a solvent and used as a dry lay-up; the guanamine and epoxy can be applied to the fibrous material and then "B-staged"; the guanamine and epoxy can first be "B-staged" and then applied in the form of a solution; or the fibrous material can be impregnated by the use of a fluidized bed or gaseous dispersion of such system, preferably with a free-flowing powder derived from the "B-staged" resin. I have also found that trichloroethylene can be used as the solvent for the epoxy resin-fatty guanamine systems. Since said solvent is nonflammable, no fire hazard is presented. An additional advantage of the present invention is that the impregnated fibrous materials can be stored at ambient room temperatures for relatively long periods of time and still be used to prepare laminates by conventional procedures. Also, the laminates prepared from the impregnated fibrous materials have high flexural and tensile strengths and retain a higher percentage of their flexural strength after 2 hours in boiling water than ordinary epoxy laminates, such as those prepared from epoxy resins and dicyandiamide.

A wide variety of guanamines may be employed as curing agents in the preparation of the impregnated fibrous materials and laminates of the present invention. They may be represented by the following formulae:

(A) 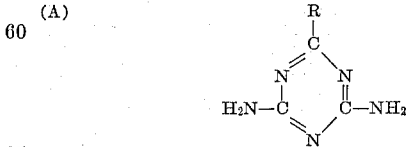

(B) 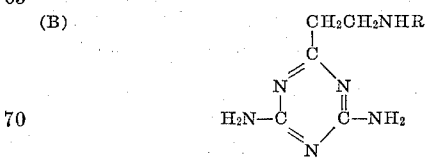

(C) 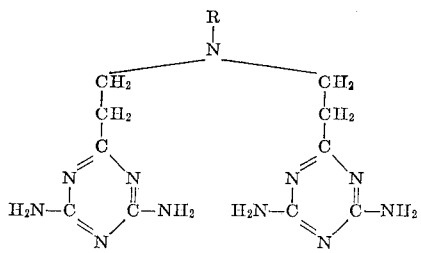

(D) 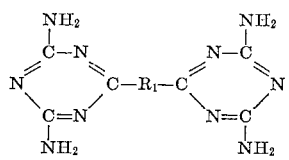

where R is an aliphatic hydrocarbon group containing from 4 to about 21 carbon atoms, preferably 6 to 21 carbon atoms, and $R_1$ is the hydrocarbon group of dimerized unsaturated fatty acids.

The foregoing guanamine compounds may be defined generally by the following formula:

$$(A)_xB$$

where A is the ring,

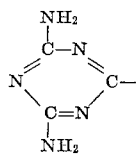

$x$ is an integer of 1 to 2 and B is selected from the group consisting of R, $RNHCH_2CH_2$—, $RN(CH_2CH_2—)_2$ and $R_1$ where R and $R_1$ have the meanings set forth above.

These guanamines are conveniently made from dicyandiamide and nitriles. Thus, the aliphatic substituted guanamines may be prepared from aliphatic nitriles such as those derived from fatty acids. Compound B may be made from the nitrile, $RNHCH_2CH_2CN$, which is the acrylonitrile adduct with the fatty amine $RNH_2$. Compound C may be made from the acrylonitrile diadduct of the fatty amine $RNH_2$, $RN(CH_2CH_2CN)_2$. Compound D may be made from the dinitrile prepared from dimerized fatty acids such as linoleic acid. Thus, the fatty guanamines may be prepared from the higher fatty acids containing from 5 to 22 carbon atoms, or the polymerized derivatives thereof, by converting the fatty acids to the nitriles and then reacting the nitriles with dicyandiamide. The fatty acid employed may be a single, isolated fatty acid or may be the mixed fatty acids from a fat or oil or any selected fraction of such fatty acids. Moreover, the fatty acids may be either saturated or unsaturated. In addition, it is understood that the term "fatty" as used herein is not intended to exclude the branch chain products having the same number of carbon atoms. Fatty guanamines derived from the $C_8$ to $C_{18}$ acids of coconut oil are referred to as cocoguanamines.

Various methods of preparing the above-described guanamines are known in the art. Thus, see the following U.S. Patents: 2,447,175; 2,459,397; 2,606,904; 2,684,366; 2,777,848; 2,792,395; and 2,900,367.

Any epoxy resin can be used in the present invention. Such resins include the reaction products of polyhydric phenols with polyfunctional halohydrins. Typical polyhydric phenols useful in the preparation of such resins include resorcinol and various bisphenols resulting from the condensation of phenol with aldehydes and ketones such as formaldehyde, acetaldehyde, acetone, methyl ethyl ketone, and the like. A typical epoxy resin of this type is the reaction product of epichlorohydrin and 2,2-bis(p-hydroxyphenyl)propane (Bisphenol A), the resin having the following theoretical structural formula:

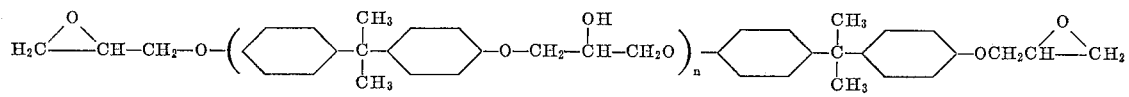

where $n$ is 0 or an integer up to 10. Generally speaking, $n$ will usually be no greater than 3 or 4, and may be 1 or less. However, other types of epoxy resins may be employed.

Another of such epoxy resins are those which are the reaction product of epichlorohydrin and bis(p-hydroxyphenyl)sulfone. Still another group of epoxy compounds which may be employed are the glycidyl esters of polymeric fat acids. These glycidyl esters are obtained by reacting the polymeric fat acids with polyfunctional halohydrins such as epichlorohydrins. In addition, the glycidyl esters are also commercially available epoxide materials. As the polymeric fat acids are composed largely of dimeric acids, the glycidyl esters thereof may be represented by the following theoretical, idealized formula:

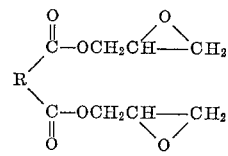

where R is the divalent hydrocarbon radical of dimerized unsaturated fatty acids.

The polymeric fat acids are well known materials, commercially available, which are the products prepared from the polymerization of unsaturated fatty acids to provide a mixture of dibasic and higher polymeric fat acids. The polymeric fat acids are those resulting from the polymerization of the drying or semi-drying oils or the free acids or the simple aliphatic alcohol esters of such acids. Suitable drying or semi-drying oils include soybean, linseed, tung, perilla, oiticica, cottonseed, corn, sunflower, safflower, dehydrated castor oil, and the like. The term "polymeric fat acids," as used herein and as understood in the art, is intended to include the polymerized mixture of acids which usually contain a predominant portion of dimer acids, a small quantity of trimer and higher polymeric fat acids and some residual monomers.

In general, the most readily available naturally occurring polyunsaturated acid available in large quantities is linoleic. Accordingly, it should be appreciated that polymeric fat acids will as a practical matter result from fatty acid mixtures that contain a preponderance of linoleic acid and will thus generally be composed largely of dimerized linoleic acid. However, polymerized fatty acids may be prepared from the naturally occurring fatty acids having from 8 to 22 carbon atoms. Illustrative thereof are oleic, linolenic, palmitoleic, and the like.

Other types of epoxy resins which may be used in the present invention and which are commercially available epoxy materials are the polyglycidyl ethers of tetraphenols which have two hydroxy aryl groups at each end of an aliphatic chain. These polyglycidyl ethers are obtained by reacting the tetraphenols with polyfunctional halohydrins such as epichlorohydrin. The tetraphenols used in preparing the polyglycidyl ethers are a known class of compounds readily obtained by condensing the appropriate dialdehyde with the desired phenol. Typical tetraphenols useful in the preparation of these epoxy resins are the alpha,alpha,omega,omega-tetrakis(hydroxyphenyl)alkanes, such as 1,1,2,2-tetrakis(hydroxyphenyl) ethane, 1,1,4,4-tetrakis(hydroxyphenyl)butane, 1,1,4,4-tetrakis(hydroxyphenyl)-2-ethylbutane and the like. The epoxy resin reaction product of epichlorohydrin and tetraphenol may be represented by the following theoretical structural formula:

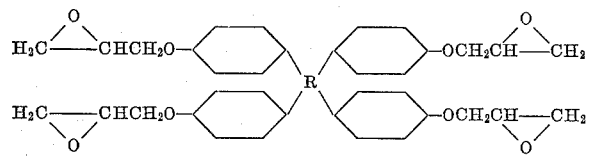

where R is a tetravalent aliphatic hydrocarbon chain having from 2 to 10, and preferably, from 2 to 6 carbon atoms.

Still another group of epoxide materials are the novolac epoxy resins. Such resins are well-known substances and readily available commercially. The resins may be represented by the following theoretical, idealized formula:

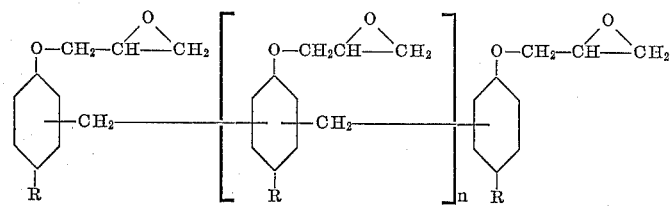

where R is selected from the group consisting of hydrogen and alkyl groups having up to 18 carbon atoms, and $n$ is an integer of from 1 to 5. In general, $n$ will be an integer in excess of 1 to about 3.

In general, these resins are obtained by reaction of epichlorohydrin with the well-known novolac resins. The novolac resins, as is known in the art, are produced by condensing the phenol with an aldehyde in the presence of an acid catalyst. Novolac resins from other aldehydes such as, for example, acetaldehyde, chloral, butyraldehyde, furfural, and the like, may also be used. The alkyl group, if present, may have a straight or a branched chain. Illustrative of the alkylphenol from which the novolac resins may be derived are cresol, butylphenol, tertiary butylphenol, tertiary amylphenol, hexylphenol, 2-ethylhexylphenol, nonylphenol, decylphenol, dodecylphenol, and the like. It is generally preferred, but not essential, that the alkyl substituent be linked to the paracarbon atom of the parent phenolic nucleus. However, novolac resins in which the alkyl group is in the ortho position have been prepared.

The novolac epoxy resin is formed in the well-known manner by adding the novolac resins to the epichlorohydrin and then adding an alkali metal hydroxide to the mixture so as to effect the desired condensation reaction.

In addition, other epoxy resins which may be used to prepare the impregnated fibrous materials and laminates of the present invention are epoxidized olefins, such as epoxidized polybutadiene and epoxidized cyclohexenes, and the diglycidyl ethers of the polyalkylene glycols. These latter ethers are readily available commercially and may be represented by the following theoretical, idealized formula:

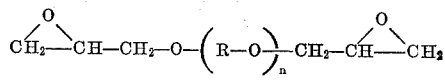

where R is an alkylene radical having from 2–5 carbon atoms and $n$ is an integer of from about 1 to about 50. R is preferably ethylene or propylene or mixtures thereof and $n$ is preferably about 3 to about 10. It is understood that $n$ represents an average figure since the ethers are often prepared from a mixture of glycols—i.e., tripropylene glycol, tetrapropylene glycol, and the like. Said epoxy resins may be prepared in the manner set forth in U.S. Patent 2,923,696.

In general, the epoxy resins may be described as those having terminal epoxide groups.

In addition, the epoxy resins may be characterized further by reference to their epoxy equivalent weight, the epoxy equivalent weight of pure epoxy resin being the mean molecular weight of the resins divided by the mean number of epoxy radicals per molecule, or in any case, the number of grams of epoxy equivalent to one epoxy group or one gram equivalent of epoxide. The epoxy resinous materials employed in this invention have epoxy equivalent weights of from about 140 to about 2000.

While all of the above-described fatty guanamines and epoxy resins can be used to impregnate the fibrous material and to prepare laminates, it is preferred to use the monoalkyl fatty guanamines having the Formula A and the epoxy resins prepared from epichlorohydrin and polyhydric phenols such as Bisphenol A and the tetraphenols. Additionally, mixtures of the same or different types of solid and/or liquid epoxies may be employed. It is understood that the properties of the laminates will vary somewhat depending upon the particular epoxy resin and fatty guanamine used.

The fatty guanamine is employed in an amount sufficient to cure the epoxy resin to an insoluble and infusible polymer. Generally, said guanamines are used in ratios by weight curing agent to epoxy resin of from about 5:95 to 75:25 and preferably from about 10:90 to 25:75. It is particularly preferred to use a ratio of 15.85.

The epoxy resin-fatty guanamine systems may be used to impregnate any of a wide variety of fibrous materials. By fibrous material is meant individual fibers or monofils, rovings, yarns, mats, fabrics, wood sheets, mica and the like. Such materials include the natural or artificial textile materials, such as cotton, linen, natural silk and artificial silk such as the artificial silk obtained from cellulose acetate or other organic esters or ethers of cellulose and the regenerated cellulosic type of artificial silk obtained by the viscose, cuprammonium or nitrocellulose process, jute, hemp, sisal, rayon, animal fibers, such as wool, hair, mohair, synthetic fibers including the fibers from polyesters, such as for example the ethylene glycol terephthalic acid polyesters (Dacron), the acrylic polyvinyls, such as for example the acrylonitrile polymers (Orlon), the polyethylenes, polyurethanes (Perluran), polyvinyl alcohol proteins (Caslen), alginic (Alginate rayon), non-acrylic polyvinyls as vinyl chloride and vinylidene polymers (Vinyon), mineral fibers (Fiberglas), polyamides, such as aliphatic dicarboxylic acid-polyamine reaction products (nylon) and the like. While any of the above fibrous materials can be used to prepare the laminates of the present invention, it is preferred to use fiber glass monofilaments, rovings, yarns, and fabrics.

Prior to impregnation, the fibrous material may be treated chemically or by heat to remove any sizing which may have been added during or before the formation of the yarn, rovings and fabrics. For example, glass fabrics can be heat cleaned, or treated with keying agents such as methacrylato chromic chloride (Volan A) or the reaction product of resorcinol and allyltrichlorosilane.

The fibrous materials can be impregnated with the epoxy resin-guanamine system by a number of different methods. In this respect, both "A-stage" and "B-stage" resins can be used. A "B-stage" resin can generally be described as a partially reacted composition which is stable for extended periods of time, but is capable of being cured quickly at elevated temperatures. The epoxy-fatty guanamine compositions may be described as proceeding through three stages, A, B, and C.

The "A-stage" would be a simple blend or mixture of the epoxy resin and guanamine in which essentially no reaction has taken place. Such a simple blend or mixture will be stable for great lengths of time, but may or may not be homogeneous.

The "B-stage" is the same resin composition which has been partially reacted or cured and is quite stable for extended periods of time. The "B-stage" resin can be further reacted at elevated temperatures to yield the finally cured stage, the "C-stage," which is an infusible and insoluble polymer. The use of the "B-stage" resin allows for rapid curing and still provides a stable starting material. The "B-stage" resin can be defined generally as a partially reacted product which will undergo little or no physical change during extended storage at ambient room temperatures and in which the reactants are homogeneously compatible in a one-component, stable compound ready for final curing at elevated temperatures.

The "B-stage" resin is prepared by heating a mixture of the epoxy resin and fatty guanamine to effect partial reaction and stopping such reaction before the "C-stage" is reached. This partial reaction can be effected at various temperatures. At higher temperatures, the time of heating becomes short for producing the "B-stage" resin and care must be taken that the time is not sufficiently extended so as to result in the "C-stage." At lower temperatures, the heating period is slightly longer and more control can be exercised. As a practical matter, the epoxy resin-guanamine system will generally be "B-staged" at temperatures in the range of 100 to 210° C. Temperatures outside this range may be used, however, although such may present some problems. For example, at temperatures above 210° C., the time of heating is so short that it is difficult to prevent advancement of the cure to the "C-stage" or fully cured state. At temperatures below 100° C., the time of heating is so prolonged as to be impractical or uneconomical. A common temperature used in practice is about 150° C., at which temperature the heating period is sufficiently long to allow for control over the reaction and yet is not an impractical or uneconomical length of time.

As the temperature and period of heating will vary somewhat dependent on the particular epoxy resin, the particular guanamine and the proportions thereof, some means of indicating when the "B-stage" resin is reached had to be devised. It is, of course, most important that the reaction not be carried out to the point where gelation occurs. One means of preventing gelation, which can be used during the heating period, is the observance of the viscosity of the product. Another is to determine the oxirane oxygen content periodically and observe the rate of change thereof.

In observing the viscosity during heating, it will be noted that very little change occurs during the initial heating period. As heating is continued, the rate of change in viscosity begins to increase somewhat and just prior to gelation the rate increases very rapidly. When this rate increases greatly, the heating must be stopped quickly and the product cooled for gelation would occur in a brief time, a few minutes. The viscosity may be observed during the course of the reaction or first conducted on a small scale to obtain some indication of the approximate time of heating.

In the oxirane oxygen test, samples are withdrawn periodically and the oxirane oxygen content determined by titration with HBr in acetic acid. Since HBr titrates both the oxirane oxygen of the epoxy resin and the amine of the guanamine, a value is obtained representing the total of these two. The amine contribution remains constant since primary amines continue to titrate even after reaction with oxirane oxygen. Thus, any decrease in titration results may be attributed to the disappearance of oxirane oxygen.

Thus, the "B-stage" resins may be prepared by heating a mixture of the epoxy resin and fatty guanamine at a temperature sufficient to effect partial reaction, for example, at about 100 to 210° C., and preferably at 140 to 170° C. Thereafter, the heating should be stopped and the reaction mixture should be cooled before final curing occurs so that a partially cured resin results. The termination point may be determined by observation of the viscosity and/or oxirane oxygen content. In general, a "B-stage" resin will exist when the reaction is from about 5 to 90% complete based on the disappearance of oxirane oxygen. As a practical matter, the preferred "B-stage" resins are those in which the reaction is about 15 to 50% complete, the most desirable being about 25 to 40% complete.

In some instances it may be desirable to prepare the "B-stage" resin by reacting the fatty guanamine and epoxy resin in a suitable solvent, such as the mono-methyl, ethyl, or butyl ethers of ethylene glycol, trichloroethylene and the like, at the temperatures described hereinabove. The reaction or partial curing can be more easily controlled by this method since the removal of the heat of reaction is greatly facilitated by the use of a less viscous medium. The extent of partial curing can again be controlled by determining the oxirane oxygen content periodically and observing the rate of change thereof. It is also possible to measure the degree of "B-staging" by continuous measurement of viscosity. After the "B-stage" has been reached and the reaction solution cooled to terminate the reaction, the solvent may be removed by using low temperature vacuum distillation. However, it is preferred to leave the partially cured resin dissolved in the solvent. Such solutions can be used directly to impregnate the fibrous material.

It is also possible to prepare the "B-stage" resin in the presence of the fibrous material. Thus, the epoxy resin and guanamine, with or without solvent, along with the fibrous material can be reacted under the conditions described hereinabove. After the "B-stage" is reached (determined, for example, by measurement of oxirane oxygen content), the reaction medium can be cooled, leaving the fibrous material impregnated with the "B-stage" resin. If a solvent was used, it can be removed by conventional procedures. The impregnated fibrous material can then be stored at ambient room temperatures for relatively long periods of time before being subjected to the laminating operation. Of course, the laminating operation could take place immediately, if desired.

A wide variety of methods can be used to impregnate the fibrous material with the epoxy resin-fatty guanamine systems. The following methods are only representative thereof and are not to be taken as limiting the invention to such methods:

(A) IMPREGNATION WITH "A-STAGE" RESIN (1) Wet lay-ups: The fatty guanamine can be dissolved in a fluid epoxy resin and then applied to the fibrous material. Normally, the impregnated fibrous material would be immediately subjected to the laminating operation due to the low viscosity of the resin-guanamine solution.

(2) Dry lay-ups: The epoxy resin and fatty guanamine can be dissolved in a suitable solvent such as trichloroethylene, Cellosolve, methyl ethyl ketone and the like or blends thereof with alcohols such as isopropanol or aromatic hydrocarbons such as xylene and then the resulting solution can be applied to the fibrous material, followed by removal of the solvent.

(3) Fluid bed: A mixture of a solid epoxy resin and fatty guanamine can be pulverized by any suitable method to form a powder. The fibrous material can then be impregnated by the use of a fluidized bed of such powder as will be explained more fully hereinbelow.

(4) Flocking gun: A powder, as in method 3, may be applied to the fibrous material in the form of a fine spray or gaseous dispersion using an apparatus such as a flocking gun, as will be explained more fully hereinbelow.

(B) IMPREGNATION WITH "B-STAGE" RESIN (1) "B-staging" in presence of the fibrous material: This method has been described above with respect to preparation of the "B-stage" resins. It can be added that both solid and liquid epoxies and mixtures thereof can be used.

(2) Dry lay-ups: The "B-stage" resin can first be prepared and then dissolved in a suitable solvent (the solvents of method A–2 are equally suitable here). The fibrous material can then be dipped into or passed through the solution, followed by removal of the solvent. Alternatively, the "B-stage" resin can be prepared in the solvent and the resulting solution applied directly to the fibrous material.

(3) Fluid bed: The prepared "B-stage" resin can be pulverized by any suitable method to form a powder and then the fibrous material can be impregnated by a fluidized bed of such powder.

(4) Flocking gun: The "B-stage" powder (see method B–3) can be applied to the fibrous material in the same way as the "A-stage" powder (see method A–4).

A fluidized bed is a mass of solid particles which exhibits the liquid-like characteristics of mobility, hydrostatic pressure, and an observable upper free surface or boundary zone across which a marked change in concentration of particles occurs. Alternatively, the fluidized bed may be termed a "dense phase" having an upper free surface. These definitions are found in an article entitled "Fluidization Nomenclature and Symbols" appearing at pages 1249 and 1250 in Industrial and Engineering Chemistry, volume 41, Number 6, June 1949. It is formed by introducing an ascending current of gas into the powdered material, the bed being maintained in the fluidized state by controlling the flow of the gas, which is under moderate pressure.

The fibrous material is preferably heated and then passed through the fluidized bed of the "A-stage" or "B-stage" epoxy resin-fatty guanamine powders. Individual particles of the powders strike and adhere to the hot surface of the fibrous material. This process may be used to impregnate pieces of fibrous material of any size or shape, the only limitation being the type and size of the fluidizing apparatus used. Additionally, the process may be continuous. Thus, a monofilament, yarn, roving, fabric or the like may be pulled from a spool over a heating element and then passed through the fluidized bed. A particularly preferred procedure is to draw the monofilament or yarn directly from the spinneret through the fluidized bed. In this way, a separate heating element is not required. This latter method is especially advantageous when hot-melt fibrous materials such as fiber glass, nylon and the like are to be impregnated. The impregnated materials, after passage through the fluidized bed, can be cut if necessary, and immediately subjected to the laminating operation or they can be stored, as such, for relatively long periods.

Any suitable apparatus may be used to fluidize the epoxy-fatty guanamine powders. One such apparatus is the "Vibro-Fluidizer," manufactured by Armstrong Resins, Inc., of Warsaw, Indiana. Another is that described in U.S. Patent 2,844,489.

The "A-stage" or "B-stage" epoxy-guanamine resin systems are ground to a small particle size by any suitable method such as with a Micro-Pulverizer. The fluidizing powders should be of relatively uniform particle size. It has been found that good results are obtained when the powders have the largest percentage of particles in the size range of 50–200 microns, and preferably in the size range of 75–150 microns.

Any gas which is reasonably inert at the temperatures and with the materials employed may be used as the gaseous medium for fluidizing the powders. Air is the preferred gas for reasons of economy (the "A-stage" and "B-stage" epoxy resin-fatty guanamine system powders are not unduly sensitive to either oxygen or moisture). However, other gases such as nitrogen, may be employed. The pressure of the gas may vary greatly, depending on the particular shape and dimensions of the treating tank as well as on the particular powder used. The gas is preferably maintained at ambient room temperatures. Higher or lower temperatures can be used, however, if desired.

The heating of the fibrous material should be to a temperature above the melting point of the powder. Temperature as low as 95° C. can be used with some of the powders. There is no definite upper limit, although the fibrous materials should not be heated so high as to cause degradation of the powder or degradation of the fibrous material itself. As a practical matter, the temperature and the speed at which the fibrous material is drawn through the fluidized bed will be determined by the melting point and flow characteristics of the fluidizing powder and the ability of the fibrous material to retain heat. In a continuous process, for example, the fiber can be drawn over a guide roll at a speed of a few feet per minute to 20 or more feet per minute, passed over electrically heated steel contact bars maintained at about 300–600° C. and then passed through the fluidized bed. The period of immersion of the fibrous material in the fluidized bed may, therefore, vary within relatively wide limits depending on the desired ratio of resin to fibrous material, the heat capacity of the fibrous material, the temperature to which the fibrous material is preheated, and the particular powder used. The time of immersion may thus vary from a fraction of a second up to 30 seconds or more.

Instead of heating the fibrous material prior to immersion in the fluidized bed, other means can be employed to cause the powder to adhere to the material. One such method is to pre-coat the fibrous material with a substance such as cyclohexanol or a sticky primer. Upon passing the fibrous material through the fluidized bed, the epoxy resin-fatty guanamine system powders strike thep rimed surface and adhere. It may be advantageous to use the above procedure where the fibrous materials cannot be preheated to high temperatures. However, the primer would be selected in such a manner as to not adversely affect the properties of the laminates prepared from the impregnated, primed fibrous materials. It is preferred to preheat the fibrous material prior to immersion in the fluidized bed.

In certain instances, the "A-stage" and "B-stage" powders can be applied to the fibrous material in the form of a fine spray or dispersion in any gaseous medium. Air is entirely suitable as the gaseous medium. The powder can be atomized or dispersed in the gaseous medium by the use of any apparatus or method adapted for such a purpose. A particularly suitable apparatus is a flocking gun which is commercially available. One such apparatus is a "Model 171" flocking gun available from Binks Manufacturing Co., Chicago, Illinois. When using the above apparatus and method, the fibrous material can be preheated or primed and then sprayed with the powder. After the desired amount of powder has adhered to the fibrous material, the spraying is stopped. The use of this method is particularly advantageous where large pieces or sheets of fabric, for example, are to be impregnated.

The method of impregnating fibrous materials by the use of the fluidized bed and flocking gun procedures is further described and claimed in the copending application of William B. Reynolds and Dwight E. Peerman, Serial No. 194,148, filed of even date, entitled Impregnation of Fibrous Materials.

The impregnated fibrous material prepared by any of the above procedures can be stored at ambient room temperatures for relatively long periods of time before being subjected to the laminating operation. This is particularly advantageous since it relieves the use of the problems connected with handling and measuring the individual reactants. Also, any difficulties which might be encountered in the impregnation step are eliminated. In addition, my invention provides laminating materials which can be tailored to the needs of the user and which can be ordered and stored well in advance of the laminating operation. The use of "B-stage" epoxy resin-fatty guanamine systems for impregnating the fibrous material is particularly preferred since both liquid and solid epoxies can be used, the epoxy and guanamine are tied up in a partial reaction product which provides an even distribution of both on the fibrous material, and the impregnated fibrous material can be laminated in a shorter time than when the "A-stage" resin is used.

The resin content of the impregnated fibrous material can be varied over relatively wide limits. Generally, the resin content (epoxy resin plus fatty guanamine) should be within the range of about 10 to 65% by weight and preferably in the range of about 15 to 55% by weight. It is understood that the properties of the laminates will vary somewhat depending on the resin content, the type of fibrous material, the particular epoxy resin-fatty guanamine system, and the laminating procedure.

Various flexibilizers, fillers, diluents, pigments and the like can also be used in combination with the epoxy resin-guanamine system and the fibrous materials. Representative flexibilizers are thermoplastic polyamide resins, polysulfides, polyesters, fatty diamines, glycols, isocyanates, polymerized fatty acids and the like. Examples of diluents are xylene, styrene oxide, allyl glycidyl ether, and so forth. Fillers can be used to reduce cost and shrinkage and/or improve corrosion resistance. Zinc tetraoxychromate, kaolin clay, talc, and $CaCO_3$ are representative. Pigments may be used to provide laminates of varying colors. Examples of suitable pigments include titanium dioxide, lead chromate, light and medium chrome yellow, chromium oxide, ultramarine blue, red iron oxide and toluidine red.

When powders are used as the impregnating system, it may be desirable to include therein flow-control and anti-caking agents such as amorphous silicas, various natural silicates such as attapulgite and kaolin clays, amorphous alumina, talc and finely divided calcium carbonate. Such agents are used in an amount sufficient to improve the flow of the powder and/or to prevent fusing or caking of the powder at high ambient temperatures. Of course, some of said agents also function as fillers.

These addition agents can be added to the various systems at various times. In the case of B-stage materials, pigments and the flow-control and anti-caking agents can be added either prior to, during or after the "B-staging" reaction. It is also understood that the properties of the laminates may be affected by said agents and thus the type and amount thereof will vary with the laminate properties desired.

Laminates may be prepared from the impregnated fibrous materials by conventional procedures. Thus, matched metal dies or platens pressed together mechanically and heated can be used. Both the laminating pressure and temperature can vary over wide limits. Pressures of a few to several hundred pounds per square inch may be used and the temperatures can vary from as low as about 100° C. to 400° C. and higher.

The following epoxy resins and fatty guanamines were used in the preparation of the impregnated fibrous materials and laminates of the examples which follow, said examples serving to further illustrate the invention:

*Epoxy resin A.*—A condensation product of Bisphenol A and epichlorohydrin having an epoxy equivalent weight of about 190.

*Epoxy resin B.*—A condensation product of Bisphenol A and epichlorohydrin having an epoxy equivalent weight of about 525.

*Epoxy resin C.*—A mixture of isomers and homologues of the tetraglycidyl ether of tetraphenyl ethane having an epoxy equivalent weight of about 210.

*Epoxy resin D.*—An epoxidized novolac resin wherein R in the general formula described hereinabove is hydrogen. Said resin had an epoxy equivalent weight of about 179 and a specific gravity of 1.22.

*Guanamine A.*—A cocoguanamine of the general Formula A set forth hereinabove wherein R is a $C_{11}$ alkyl group. Said guanamine was prepared from dicyandiamide and a $C_{12}$ nitrile, the latter being derived from the $C_{12}$ fraction of coconut oil acids.

*Guanamine B.*—The same as Guanamine A, except that the nitrile used in the preparation thereof was derived from the mixture of $C_8$ to $C_{18}$ acids of coconut oil.

In the examples to follow, all parts are by weight, unless otherwise indicated. The flexural and tensile properties of the laminates in all of the examples were tested according to ASTM procedures, D790–58T and D638–62T, respectively.

*Example I*

A blend of 53.5 grams epoxy resin A and 9.5 grams guanamine B was prepared by mixing the ingredients at 150° C. The blend was poured immediately onto 12 pieces (8 in. x 8 in. sq.) of fiber glass cloth (style 181 with 114 finish). The entire pile of glass cloth plus resin blend was placed in a platen press for 120 minutes at 325° F. under a pressure of 47 p.s.i. A smooth laminate resulted which had a glass content of 77.4% by weight and the following properties:

|  | P.s.i. |
| --- | --- |
| Flexural strength | 110,000 |
| Flexural modulus | $3.30 \times 10^6$ |
| Tensile strength | 63,000 |

*Example II*

Example I was repeated except that epoxy resin C was substituted for epoxy resin A and 8.6 grams of guanamine B was used. The resulting laminate was smooth, of good appearance, and contained 73.8% glass. It had a flexural strength of 80,200 p.s.i., a flexural modulus of $2.48 \times 10^6$ p.s.i. and a tensile strength of 52,250 p.s.i.

*Example III*

Example I was repeated using 51.4 grams of epoxy resin D and 10.6 grams of guanamine B. The resulting laminate was of good appearance, had a glass content of 73.5% by weight and the following properties:

|  | P.s.i. |
| --- | --- |
| Flexural strength | 84,800 |
| Flexural modulus | $2.57 \times 10^6$ |
| Tensile strength | 64,000 |

The above examples show that good laminates can be prepared from a variety of epoxy resins and a fatty guanamine using a wet lay-up technique to impregnate the fibrous materials. A similar procedure using a "B-stage" resin can be used as shown by the following example:

Example *IV*

A blend of 85 parts epoxy resin A and 15 parts guanamine A was "B-staged" in a Baker-Perkins reactor at 150° C. until the oxirane oxygen content was reduced to 5.25%. The product, when poured out of the reactor and cooled, was a rather sticky solid. It was melted and poured onto individual layers of fiber glass cloth (style 181, finish 114). The impregnated layers were cured in a matched metal die for 30 minutes at 325° F. and a pressure of 50 p.s.i. and then postcured in an oven at 350° F. for 60 minutes. The resulting laminate had a glass content of 69% by weight, a flexural strength of 95,800 p.s.i. and a flexural modulus of $2.65 \times 10^6$ p.s.i.

The following examples show various other methods of impregnating the fibrous material with the epoxy resin-fatty guanamine systems.

*Example V*

To 1245 parts epoxy resin A were added 255 parts guanamine B. This mixture was "B-staged" at 150° C. for a total of 60 minutes at which point the resin had a viscosity of 70 centipoises at 150° C. After cooling to room temperature, the product was analyzed and found to have a melting point of 100–102° C. and an oxirane oxygen content of 4.39%. A portion of the "B-stage" resin was added to a solvent consisting of a mixture of isopropanol and methyl ethyl ketone (1:1 volume ratio) to provide a 40% solids solution. Pieces of fiber glass cloth (same as used in Example I) were dipped in the solution and air dried overnight, followed by a 5-minute oven dry at 150° C. The resin pickup on the cloth was 42.7%. Six pieces of the impregnated cloth were placed in a matched metal die and molded for 45 minutes at a temperature of 325° F. and a pressure of 50 p.s.i. A smooth fiber glass laminate resulted. The laminate was postcured in an oven at 150° C. for 150 minutes and then cut into suitable pieces for testing. The laminate had a flexural strength of 90,500 p.s.i., a flexural modulus of $3.44 \times 10^6$ p.s.i., and a tensile strength of 46,500 p.s.i.

*Example VI*

Another portion of the "B-stage" resin of Example V was dissolved in trichloroethylene to provide a 40% solids solution. Sixty end glass roving was passed through a bath of this resin solution and then dried with a hot air blast. Pieces of the impregnated roving were laid parallel and molded in a matched metal die at 300° F. and 50 p.s.i. for 60 minutes. The laminate was then postcured for 60 minutes in an oven at 150° C. The resulting fiber glass laminate had a glass content of 72% by weight, was smooth and of good appearance, and had the following properties:

| | |
|---|---|
| Flexural strength _____p.s.i__ | 146,000 |
| Flexural modulus _____p.s.i__ | $5.68 \times 10^6$ |
| Tensile strength _____p.s.i__ | 85,500 |
| Heat distortion temp. _____°C__ | >225 |

After 67 days storage at 90–100° F., another portion of the impregnated rovings was molded and found to form an excellent laminate. This shows that laminates can be prepared from the impregnated fibers of the present invention even after extended storage at high ambient temperatures.

*Example VII*

Thirty-nine parts guanamine B and 261 parts epoxy resin C were heated separately to melt and then poured together at 150° C. The blend was heated with stirring for 15 minutes at which point a sample of the resin had an oxirane oxygen content of 6.51%. A portion of the product was immediately dissolved in a blend of isopropanol and methyl ethyl ketone (1:1 volume ratio) to provide a 40% solids solution. Fiber glass cloth (style 181, finish 114) was impregnated with the solution and dried. Six plies of the impregnated cloth were placed in a matched metal die and cured at 325° F. for 90 minutes under low pressure (50 p.s.i.). The resulting laminate contained 62% by weight glass and had the following properties:

| | P.s.i. |
|---|---|
| Flexural strength _____ | 79,100 |
| Flexural modulus _____ | $1.90 \times 10^6$ |
| Tensile strength _____ | 51,200 |

*Example VIII*

Another portion of the "B-stage" resin of Example VII was dissolved in trichloroethylene to provide a 40% solids solution. Sixty end glass roving was passed through this solution and dried. Parallel strands of the dried, impregnated roving were laid up in a matched metal die and cured at 300° F. for 60 minutes under low pressure (50 p.s.i.). The laminate was then postcured at 350° F. for 60 minutes. It was smooth and of excellent appearance, had a glass content of 77% by weight, and the following properties:

| | P.s.i. |
|---|---|
| Flexural strength _____ | 181,000 |
| Flexural modulus _____ | $5.40 \times 10^6$ |
| Tensile strength _____ | 42,900 |

After 67 days' storage at 90–100° F., another portion of the impregnated rovings was laminated as above. The good quality laminate produced was found to have a flexural strength of 37,100 p.s.i., a flexural modulus of $8.7 \times 10^6$ p.s.i. and a flexural deformation temperature of greater than 225° C.

*Example IX*

A blend of 247.5 parts epoxy resin D and 52.5 parts guanamine B was heated to 150° C. for a period of 30 minutes to obtain a "B-staged" resin having an oxirane oxygen content of 7.0%. A portion of the resin was dissolved in a solvent consisting of equal parts of isopropanol and methyl ethyl ketone to provide a 40% solids solution. Fiber glass cloth (style 181, finish 114) was impregnated with this solution, dried overnight and then laminated in a matched metal die for 120 minutes at a temperature of 325° F. and a pressure of 50 p.s.i. The laminate, after a postcure in an oven at 300° F. for 120 minutes, was smooth and of good appearance. It had a glass content of 58.5% by weight and the following properties:

| | P.s.i. |
|---|---|
| Flexural strength _____ | 75,700 |
| Flexural modulus _____ | $2.74 \times 10^6$ |
| Tensile strength _____ | 42,800 |

*Example X*

Another portion of the "B-staged" resin of Example IX was dissolved to 40% solids content in trichloroethylene. Sixty end fiber glass roving was impregnated by continuous dipping in this solution, followed by drying in a hot air stream. The dried roving was cut up, laid in a parallel fashion in a matched metal die and cured for 60 minutes at 300° F. and 50 p.s.i. The laminate was then postcured in an oven at 350° F. for 60 minutes. It was smooth, of excellent appearance, contained 78% by weight glass, and had the following properties:

| | P.s.i. |
|---|---|
| Flexural strength _____ | 181,000 |
| Flexural modulus _____ | $5.37 \times 10^6$ |
| Tensile strength _____ | 76,700 |

*Example XI*

Eighty-five parts epoxy resin A and 15 parts guanamine A were added to trichloroethylene to provide a 40% solids solution (resin plus guanamine). This solution was heated at 129° C. for 210 minutes to obtain a "B-stage" resin having an oxirane oxygen content of 4.8% on a 100% solids basis. Fiber glass cloth (style 181, finish 114) was dipped into the solution and then dried. A six-ply laminate was made in a matched metal die from the impregnated cloth (cured 60 minutes at temperature of 350° F. and a pressure of 50 p.s.i.). The laminate had a glass content of 69.7%, a flexural strength of 99,200 p.s.i. and a flexural modulus of 2.96×10⁶ p.s.i.

*Example XII*

Four hundred forty-two epoxy resin A and 442 parts epoxy resin B were melted together and then mixed with 116 parts guanamine A and 40 parts Cab-O-Sil M–5 (a commercially available amorphous silica manufactured by Godfrey L. Cabot, Inc.) having the following properties: Silica (as $SiO_2$), 99.0–99.7%; pH, 3.5–4.0; particle size, 0.015–0.020 micron in diameter; bulk density, 2.5–3.5 lbs./cu. ft.). The resulting blend was "B-staged" at 150° C. for 40 minutes at the end of which period the reaction product had a viscosity of 5,800 centipoises at 150° C. Upon cooling, the product was found to have a melting point of 93° C. had an oxirane oxygen content of 3.3%. A uniform powder was prepared by pulverizing the product along with 50 parts $Cr_2O_3$ and 50 parts $TiO_2$ (pigments). The powder was then fluidized using a "Vibro-Fluidizer." Multiple strand glass fiber yarn was pulled from a skein over a roll guide at 15 feet per minute, passed over electrically heated steel contact bars maintained at 500–600° C. and through the fluidized bed of the above-described powder. The impregnated yarn was then passed over a Teflon coated chill roll and wound on a storage drum. The impregnated yarn had a glass content of 55% by weight.

The yarn was chopped into ¾ inch lengths and compression molded at a temperature of 175° C. for 60 minutes under a pressure of 1,000 p.s.i. The molded product had the following properties:

Flexural strength _____p.s.i._ 23,100
Flexural deformation temp. _____° C__ >236
Barcol hardness _____ 60–80

Examples IV–XII show that the fibrous materials can be impregnated with the "B-stage" epoxy resin-fatty guanamine systems by a variety of methods. Thus, impregnation can be accomplished by a hot wet lay-up (Example IV), dry lay-ups using a solvent (Examples V–XI) and a fluidized bed (Example XII). In addition, the examples show that a variety of epoxy resins and fatty guanamines can be used to impregnate the fibrous materials and that the resulting laminates have excellent properties. In addition, Examples VI and VIII show that the impregnated fibrous material can be stored at ambient room temperatures for more than two months before being laminated. Example XI demonstrates that the "B-stage" resin can be prepared in solution and that said solution can then be used to impregnate the fibrous material. This is a particularly advantageous procedure since the solution allows for somewhat better control over the "B-staging" reaction and can be used directly as the impregnating medium. In addition, either the solution or impregnated fibrous material can be made up and stored for long periods prior to the laminating operation.

The following two examples show that other fibrous materials can be impregnated and used to prepare laminates according to the present invention.

*Example XIII*

A 40% solids trichloroethylene solution of the "B-stage" resin of Example IX was used to impregnate 2 inch chopped sisal fiber. After drying, the impregnated sisal fiber was cured in a matched metal die at a temperature of 325° for 60 minutes under a pressure of 50 p.s.i. The resulting laminate had a flexural strength of 8,700 p.s.i. and a flexural modulus of 3.0×10⁵.

*Example XIV*

Example XIII was repeated except that a trichloroethylene solution of the "B-stage" resin of Example VII was used instead of the resin of Example IX. The resulting laminate had excellent formation and a flexural strength of 16,800 p.s.i.

*Example XV*

For purposes of comparison, a laminate was prepared from dicyandiamide and epoxy resin B. Thus, 96 parts epoxy resin B and 4 parts dicyandiamide were blended at 145° C. As soon as the mixture became clear, it was dissolved as a 40% solution in acetone. Fiber glass cloth (style 181, finish 114) was dipped into the solution and allowed to dry overnight. Six plies of the impregnated cloth were placed in a matched metal die and cured for 60 minutes at a temperature of 300° F. and a pressure of 50 p.s.i. The resulting smooth laminate was postcured at 350° F. for 60 minutes. It had a glass content of 57% by weight, a flexural strength of 97,000 p.s.i., a flexural modulus of 3.2×10⁶ p.s.i. and a tensile strength of 56,700 p.s.i.

Portions of the laminates of Examples IV, VII, IX, and XV were placed in boiling water for two hours, wiped dry, allowed to attain room temperature and immediately tested for flexural strength. The original flexural strength, the flexural strength after boiling in water for 2 hours and the percent reduction of strength of the laminates are set forth in the following Table I.

TABLE I

| Laminate | Original Flexural Strength (p.s.i.) | Flexural Strength After Immersion In Boiling Water For Two Hours (p.s.i.) | Percent Reduction In Flexural Strength |
|---|---|---|---|
| Exp. IV | 90,500 | 76,600 | 15.3 |
| Exp. VII | 79,100 | 75,400 | 4.6 |
| Exp. IX | 75,700 | 73,900 | 2.4 |
| Exp. XV | 97,000 | 70,000 | 27.8 |

The data of the above table show that the laminates of the present invention (Examples IV, VII, and IX) retain a higher percentage of their flexural strength after 2 hours in boiling water than do conventional laminates (Example XV).

The impregnated fibrous materials of the present invention can be used to prepare a wide variety of laminates which are useful for various purposes. Thus, the laminates can be used in the aircraft industry as structural sheeting in ducts, radomes, tail sections and elevators and as materials for lightweight honeycomb sections. They can also be used in electrical switch gears, instrumentation panels, high-performance moisture-resistant printed circuit bases, electrical-coil insulation, low pressure bearing surfaces and similar specialized applications throughout industry. They also find utility in repairing damaged automobile bodies and fenders and in the preparation of boat hulls and the like. The above list of laminate applications is by no means exhaustive, but rather represents examples of utilities of my versatile laminates.

The impregnated fibrous materials may also be used for other purposes. As one example, they can be used to prepare crease-resistant clothing, drapes and the like.

This application is a continuation-in-part of my co-pending applications: Serial No. 77,763, filed December 22, 1960, now abandoned; Serial No. 13,652, filed March 8, 1960, now abandoned; and Serial No. 90,947, filed February 23, 1961, now abandoned.

It is to be understood that the invention is not to be limited to the exact details of operation or the exact compositions and materials described, as obvious modifications and equivalents will be apparent to those skilled in the art and the invention is to be limited only by the scope of the appended claims.

The embodiments of the invention in which an exclusive property or privilege is claimed are defined as follows:

1. A curable product consisting essentially of a fibrous material impregnated with a partial reaction product, said partial reaction product having been prepared by:
(I) reacting at temperatures in the range of about 100 to 210° C. (1) one or more epoxy resins having terminal 1,2-epoxide groups,

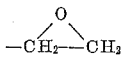

with (2) a fatty guanamine in an amount sufficient to cure the epoxy resin reactant to an insoluble and infusible polymer, said fatty guanamine being selected from the group consisting of (A)

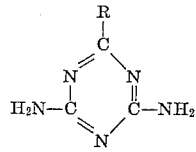

(B)

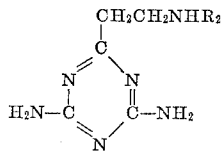

(C)

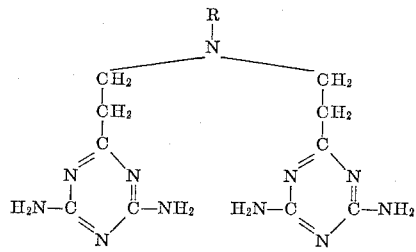

and (D)

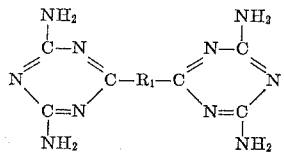

where R is an aliphatic hydrocarbon group containing from 4 to 21 carbon atoms and $R_1$ is the divalent hydrocarbon group of dimerized unsaturated fatty acids of 5 to 22 carbon atoms; and (II) terminating the reaction by cooling when 5 to 90% complete.

2. The curable product of claim 1 wherein the weight ratio of the fatty guanamine to the epoxy resin reactant in the partial reaction product is in the range of about 5:95 to 75:25.

3. The curable product of claim 1 which contain a total of about 10 to 65% by weight of the partial reaction product prepared from the fatty guanamine and the epoxy resin reactant.

4. The curable product of claim 1 wherein the fatty guanamine has the formula

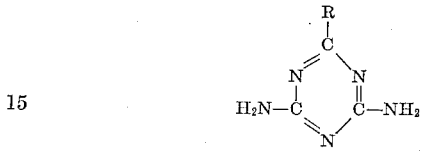

where R is an aliphatic hydrocarbon group containing from 4 to 21 carbon atoms.

5. The curable product of claim 1 wherein the epoxy resin reactant has an epoxy equivalent weight of from about 140 to 2000.

6. The curable prodtuct of claim 1 wherein the epoxy resin reactant is a polyglycidyl ether of a polyhydric phenol.

7. The curable product of claim 1 wherein the fibrous material is composed of glass fibers.

8. The curable product of claim 1 which also contains a pigment.

References Cited by the Examiner

UNITED STATES PATENTS

| | | | |
|---|---|---|---|
| 2,794,754 | 6/57 | Schroeder | 117—161 |
| 2,928,811 | 3/60 | Belanger | 260—47 |
| 2,940,986 | 6/60 | Newey | 260—18 |
| 3,084,139 | 4/63 | Hamermesh | 260—47 |
| 3,085,075 | 4/63 | Lockshin | 260—18 |
| 3,087,910 | 4/63 | Wear | 260—47 |
| 3,140,556 | 7/64 | Wagner | 156—330 X |
| 3,145,207 | 8/64 | Wohnsiedler | 117—161 X |
| 3,155,743 | 11/64 | Newey | 156—330 X |

JACOB H. STEINBERG, *Primary Examiner.*

HAROLD ANSHER, ALEXANDER WYMAN,
*Examiners.*